(12) United States Patent
Newell et al.

(10) Patent No.: US 10,200,489 B2
(45) Date of Patent: Feb. 5, 2019

(54) SECURE DEMAND-DRIVEN FILE DISTRIBUTION

(71) Applicant: AirWatch LLC, Atlanta, GA (US)

(72) Inventors: Craig Farley Newell, Atlanta, GA (US); Michael Robert Jones, Hudson, OH (US); Ravishankar Chamarajnagar, Atlanta, GA (US); Hai James Le, Cumming, GA (US)

(73) Assignee: AIRWATCH LLC, Atlanta, GA (US)

( * ) Notice: Subject to any disclaimer, the term of this patent is extended or adjusted under 35 U.S.C. 154(b) by 207 days.

(21) Appl. No.: 15/185,732

(22) Filed: Jun. 17, 2016

(65) Prior Publication Data

US 2017/0366346 A1 Dec. 21, 2017

(51) Int. Cl.
*G06F 15/16* (2006.01)
*H04L 29/08* (2006.01)

(52) U.S. Cl.
CPC .............. *H04L 67/28* (2013.01); *H04L 67/02* (2013.01); *H04L 67/10* (2013.01)

(58) Field of Classification Search
CPC . H04L 9/30; H04L 67/02; H04L 67/10; H04L 67/28
USPC ........................................................ 709/219
See application file for complete search history.

(56) References Cited

U.S. PATENT DOCUMENTS 7,289,964 B1* 10/2007 Bowman-Amuah ........................ G06F 9/5038
705/1.1
2014/0040343 A1* 2/2014 Nickolov .............. G06F 9/4856
709/201

* cited by examiner

*Primary Examiner* — Kristie D Shingles
(74) *Attorney, Agent, or Firm* — Thomas Horstemeyer, LLP; Arvind R. Reddy; Jason M. Perilla

(57) ABSTRACT

Computer networks for secure demand-driven file distribution are described. In one example, a client device receives a notification to check in for updates. In response, the client device checks in with a device services computing device on a computer network. The device services computing device determines a path list to certain cache computing devices on the computer network for receipt of the files, builds a markup file including the path list to the files, and transmits the markup file to the client device. The markup file can also include unique identifiers of the files and an encryption key for secure distribution of the files. Using the markup file, the client device can request the files, and the computer network is physically and logically arranged to distribute the files among the cache computing devices and to the client device in a secure and demand-driven manner.

20 Claims, 3 Drawing Sheets

SECURE DEMAND-DRIVEN FILE DISTRIBUTION

BACKGROUND

Today, large numbers of computing devices connect to each other over the Internet and similar types of public or private computer networks. In that way, those computing devices have access to various types of electronic documents and other files and can communicate them among each other. Generally, the network topology of a computer network is related to the arrangement with which computer systems and devices are connected to each other in the computer network.

A network topology defines an arrangements of nodes, links, and other elements of a computer network. The differences between two different network topologies can be defined by the differences in the number of nodes and links, as well as the physical and logical arrangements of those nodes and links in the networks. Physical topology refers to the physical placement of the components in a network, and logical topology refers to the manner in which data is routed through a network. Some example network topologies include point-to-point, bus, star, ring, mesh, and daisy chain networks, although other network topologies can include combinations of any number of those topologies.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
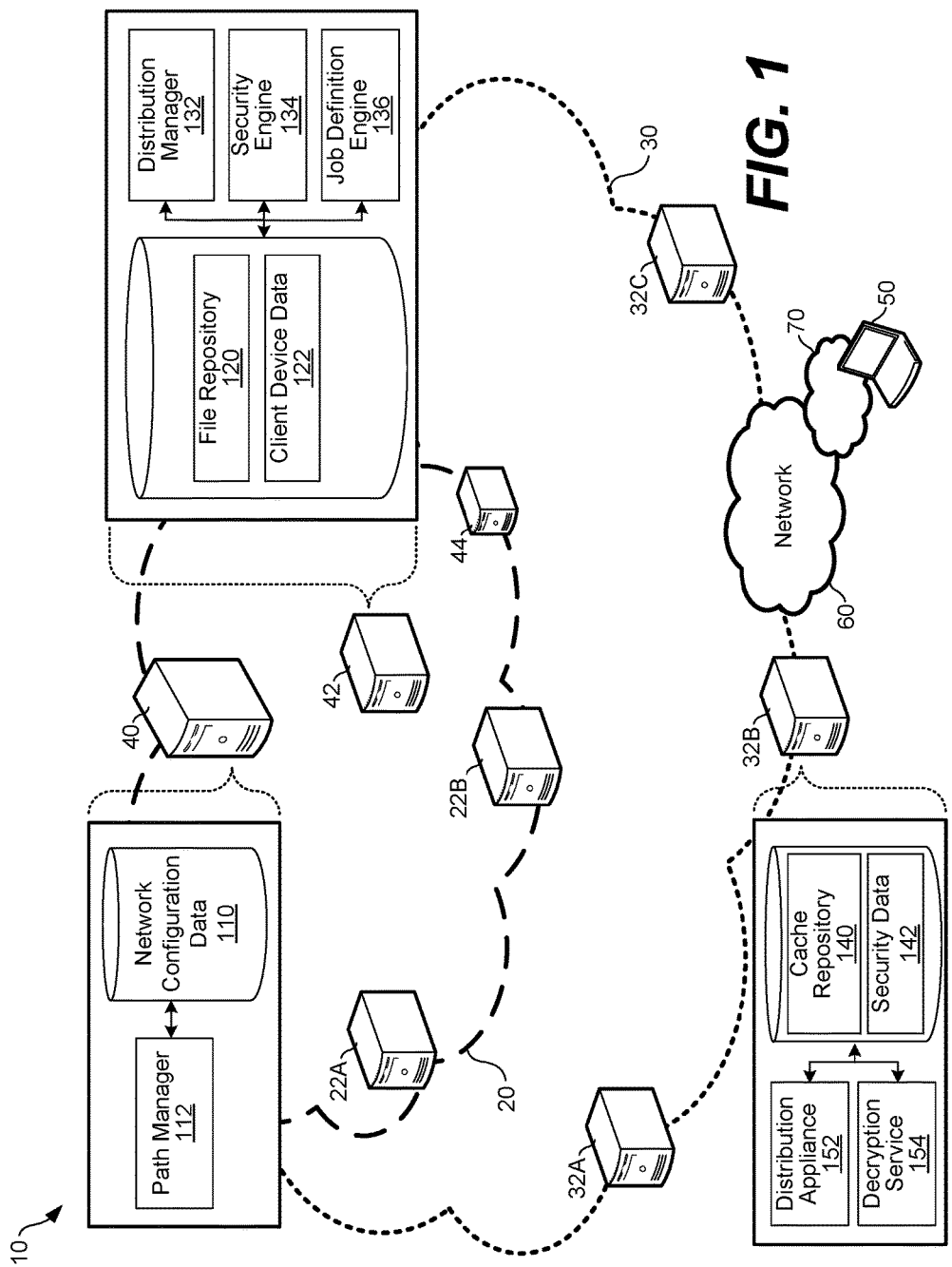
FIG. 1 illustrates an example networked environment for secure demand-driven file distribution according to various examples described herein.

Large numbers of computing devices can be connected to each other over the Internet and similar types of public or private computer networks. Using these types of networks, various types of data files can be easily distributed to computing devices. Further, new data files, including executable-code software, content, configuration files, and other types of data files can be distributed to any number of computing devices over time and as necessary in a coordinated, automated fashion.

In certain cases, such as with relatively large files, files that are updated frequently, or files including sensitive or distribution-controlled information, the physical and logical arrangement and configuration of computer networks can be designed to account for certain problems that can be encountered. For example, the mass distribution of relatively large files presents a problem in that it can overwhelm the capabilities of a computer network, particularly if that computer network hosts a significant number of client computing devices. Similarly, because network security is often a concern, computer networks for the distribution of data files can be designed with safeguards to protect sensitive or distribution-controlled information.

In this context, various computer network environments, structures, and configurations for secure demand-driven file distribution are described herein. In operation, the computer networks described herein can be used to securely distribute data files to client computing devices in a demand-driven manner. In one example, a client device receives a notification to check in for updates when new or updated files are available. In response, the client device checks in with a device services computing device on a computer network. The device services computing device determines a path list to a number of cache computing devices for receipt of the files, builds a markup file including the path list, and transmits the markup file to the client device. The markup file can also include one or more unique file identifiers for the files and one or more unique encryption key identifiers for secure distribution of the files. In various cases, one unique file identifier can identify one or more files and one unique encryption key identifier can be associated with one or more files.

Using the markup file, the client device can request the files, and the computer network is physically and logically arranged to distribute the files among the cache computing devices and to the client device in a secure and demand-driven manner. Based on the physical and logical arrangement of the cache computing devices in multiple peer levels, data files can be distributed or populated among the cache computing devices and, ultimately, to client devices, on a demand-driven basis. In other words, files are distributed to and stored on the cache computing devices as they are requested from client devices. In that way, storage space and requirements are minimized for the cache computing devices, which is a benefit particularly when distributing relatively large data files. Further, the manner (e.g., paths) in which files are distributed between the cache computing devices is configurable and reconfigurable over time to achieve efficiency and robustness in file distribution. Additionally, the distribution of files to client computing devices is conducted securely through the generation of unique file identifiers for files, unique key identifiers for encryption keys for the files, and time-sensitive tokens associated with expiration of the path lists. These demand-driven and security aspects provide technical solutions to problems or improve the operation of file distribution as described in further detail below.

Turning to the drawings, the following paragraphs introduce and outline a networked environment for secure demand-driven file distribution, followed by a description of the operation of the same. FIG. 1 illustrates an example networked environment 10 for secure demand-driven file distribution according to various examples described herein. As shown in FIG. 1, the networked environment 10 includes a networked arrangement of computing devices. As part of the arrangement, the networked environment 10 includes a peer level 20 including cache computing devices 22A and 22B and a peer level 30 including cache computing devices 32A-32C. The networked environment 10 also includes a global cache computing device 40, a device services computing device 42, and a messaging computing device 44. The computing devices described above can be communicatively connected (e.g., networked) together through the network 60, and the peer levels 20 and 30 are representative of local arrangements of peer levels in the network 60. Various client computing devices, such as the client computing device 50, can also be communicatively coupled in the networked environment 10 through the network 60, the local network 70, or other networks.

In one example, the cache computing devices 22A, 22B, and 32A-32C, the global cache computing device 40, the device services computing device 42, and the messaging computing device 44 can, respectively, collectively, or in any combination, be embodied as one or more computers including one or more processors, processing circuitry, memory, local buses and interfaces, and other structures used in computing devices. They can be embodied, respectively, by the same, similar, or different types of hardware platforms, software platforms, and combinations of hardware and software platforms. They can include one or more server computers arranged in server banks, and can be located at a single installation site or distributed among different geographical locations. They can include an arrangement of computing devices that together embody a hosted computing resource, a grid computing resource, or other distributed computing arrangement. In some cases, they can be embodied as an elastic computing resource where an allotted capacity of processing, network, storage, or other computing-related resources varies over time. As described in further detail below, they can also be embodied, in part, as certain functional or logical elements, such as executable computer-readable instructions (e.g., software), firmware, or other functional or logical components, that direct them to perform the functions described herein.

The client computing device 50 can be embodied as a computing device, processor-based device or system, or processing circuit including those in the form of a desktop computer, a laptop computer, a personal digital assistant, a wearable computing device, a cellular telephone, a set-top box, a music or media player, or a tablet computer, among other example computing devices and systems. The client computing device 50 can include various peripheral devices or components. The peripheral devices can include input or communications devices or modules, such as keyboards, keypads, touch pads, touch screens, microphones, cameras, various wired and/or wireless physical layer communications interfaces, buttons, switches, sensors, or other input or communications devices. The peripheral devices can also include a display, indicator lights, speakers, global positioning system (GPS) circuitry, accelerometers, gyroscopes, or other peripheral devices. The client computing device 50 can also be embodied, in part, as certain functional or logical elements, such as executable computer-readable instructions (e.g., software), firmware, or other functional or logical components, that direct them to perform the functions described herein.

The network 60 can include the Internet, intranets, extranets, wide area networks (WANs), local area networks (LANs), wired networks, wireless networks, cable networks, satellite networks, other suitable networks, or any combinations thereof. Although not shown in FIG. 1, the networked environment 10 can also include communicative connections to any number and type of network hosts or devices, such as website servers, file servers, cloud computing resources, databases, data stores, or any other network or computing architectures. Similarly, the local network 70 can include intranets, extranets, LANs, wired networks, wireless networks, cable networks, satellite networks, other suitable networks, or any combinations thereof.

The computing devices in the networked environment 10 can communicate with each other using various application layer, transport layer, and internet layer protocols and systems interconnect frameworks. For example, the computing devices can communicate with each other using hypertext transfer protocol (HTTP), file transfer protocol (FTP), internet message access protocol (IMAP), real-time transport protocol (RTP), simple object access protocol (SOAP), representational state transfer (REST), real-time transport protocol (RTP), real time streaming protocol (RTSP), real time messaging protocol (RTMP), transmission control protocol (TCP), user datagram protocol (UDP), internet protocol (IP), other protocols and interconnect frameworks, and combinations thereof.

Before continuing, it is noted that the illustration of the networked environment 10 in FIG. 1 is representative and provided as context for a discussion of the concepts of secure demand-driven file distribution. The concepts can be applied to similar, but different physical and logical arrangements of computing devices in computer networks. For example, the networked environment 10 can include additional (or fewer) computing devices, client computing devices, peer levels, and cache computing devices at various peer levels. Further, one or more of the global cache computing device 40, the device services computing device 42, the messaging computing device 44, or other computing devices shown in FIG. 1 can be combined together or omitted in certain cases. When combined, the functions of the computing devices shown in FIG. 1, as described below, can be supported with or without using one or more virtual layers of software platforms executing on underlying hardware platforms, for example.

Referring again to FIG. 1, among other components, the global cache computing device 40 includes network configuration data 110 and a path manager 112. The device services computing device 42 includes a file repository 120, client device data 122, a distribution manager 132, a security engine 134, and a job definition engine 136. Further, FIG. 1 shows a cache repository 140, security data 142, a distribution appliance 152, and a decryption service 154 of the cache computing device 32B, which are representative of similar components of the other cache computing devices 22A, 22B, 32A, and 32C. The components illustrated in FIG. 1 are not presented to be limiting or exhaustive, but rather to provide example context of functional or logical elements, such as data stores, executable computer-readable instructions (e.g., software), firmware, or other functional or logical components, that direct them to perform the functions described herein.

Turning to an example of file distribution by the networked environment 10, the file repository 120 can be a central or primary location where various data files are stored for distribution. From the file repository 120, files can be distributed to the cache computing devices 22A, 22B, and 32A-32C in a secure and demand-driven manner as described herein. In addition to files, the file repository 120 can include data related to which of the cache computing devices 22A, 22B, and 32A-32C store copies of the files. The file repository 120 can also include unique identifiers for the files stored in the file repository 120 and at the cache computing devices 22A, 22B, and 32A-32C. Additionally, the file repository 120 can store security-related data for the files, such as encryption keys, time-sensitive tokens, and other related data.

The messaging computing device 44 is configured to identify when new files are added or updated in the file repository 120, when certain file distribution triggering events occur, or when other conditions for file distribution are met. In response, the messaging computing device 44 is configured to transmit a notification to the client computing device 50 (or other client computing devices) to prompt it to check in with the device services computing device 42. In the context of notifications, the messaging computing device 44 can be embodied, in part, as a type of cloud messaging or push notification service.

The client computing device 50 receives the notification and, in turn, is prompted to check in with the device services computing device 42. When the client computing device 50 checks in, the device services computing device 42 is configured to perform certain tasks or functions. For example, the distribution manager 132 is configured to determine one or more network addresses or other unique identifying information associated with the client computing device 50. In that context, the unique identifying information can be any type of network addresses, such as communications protocol addresses, network addresses, media access control addresses, or other addressing data, username and password information, or other unique data or credentials. In turn, the distribution manager 132 can use this unique identifying information to identify the client computing device 50 with reference to a lookup table, for example, in the client device data 122.

Upon check in by the client computing device 50, the distribution manager 132 is also configured to determine whether one or more of the cache computing devices 22A, 22B, and 32A-32C are part of a file distribution or relay service for the client computing device 50. The distribution manager 132 can deny, modify, or tailor certain services for the client computing device 50 (and other client computing devices) depending upon whether or not one or more of the cache computing devices 22A, 22B, and 32A-32C are part of a relay service for the client computing device 50.

Once the client computing device 50 has been identified, the distribution manager 132 is configured to determine one or more data files for distribution to the client computing device 50. That is, the distribution manager 132 can determine which data files in the file repository 120 should be distributed to the client computing device 50 by reference to lookup tables, version history, an update schedule, or other information stored in the client device data 122, or based on other suitable techniques.

Once the files are identified, the distribution manager 132 is configured to transmit a call to the global cache computing device 40 to determine a path list of the cache computing devices 22A, 22B, and 32A-32C for the distribution of the files to the client computing device 50. The global cache computing device 40 serves the function of determining the manner in which files are distributed in the networked environment 10. Thus, the global cache computing device 40 is configured to determine which ones of the cache computing devices 22A, 22B, and 32A-32C should be used to distribute the files to the client computing device 50. For example, the path manager 112 of the global cache computing device 40 can receive (or determine) the network addresses of the client computing device 50 determine an optimal or preferred path through which the client computing device 50 can retrieve the data files. The path manager 112 can determine the path list based on the network configuration data 110 and the network address or other identifying information of the client computing device 50. For example, the path manager 112 can select a path list based on network logical or geographic topology, bandwidth, availability, constraints, demand, latency, bottlenecks, capacity, or other related factors. As another example, the path manager 112 can determine the path list based on a predetermined path stored in the network configuration data 110 for the client computing device 50.

In the context of determining optimal or preferred paths to client computing devices, the network configuration data 110 can include unique network addressing or other identification data for each of the cache computing devices 22A, 22B, and 32A-32C, among others, in the networked environment 10. The network configuration data 110 also includes data related to the structure or topology of the peer levels 20 and 30 among each other, and the geographic, physical, and logical arrangement among them. The network configuration data 110 can also define one or more preferences (or defined requirements) for the distribution of files to various client devices based on network bandwidth, availability, constraints, demand, latency, bottlenecks, capacity, and other related factors. The network configuration data 110 can be updated over time to define the manner in which files are distributed in the networked environment 10.

Based on the network configuration data 110, the path manager 112 can determine a preferred (or predetermined) path of data files from the file repository 120 to the client computing device 50. The path can be determined as a list of one or more of the cache computing devices 22A, 22B, and 32A-32C between the device services computing device 42 and the client computing device 50. For example, the path manager 112 can determine at least one cache computing device in each of the peer levels 20 and 30 as a path list for data files to be distributed from the file repository 120 to the client computing device 50. The path manager 112 then transmits the path list to the device services computing device 42 as a response to the call for the path list. Some particular examples of path lists and the determination of path lists are described below with reference to FIG. 2.

Using the path list, the job definition engine 136 of the device services computing device 42 constructs a markup file for the client computing device 50. The markup file can be embodied as an extensible markup language (XML) or other similar type of file, for example, but can be formatted and structured in other suitable ways. As described in further detail below, the markup file can be used by the client computing device 50 to request a copy of the files identified for distribution. The markup file can include the path list generated by the global cache computing device 40, along with one or more unique file identifier(s) and encryption key identifiers(s) for the files. The markup file can also include one or more time-sensitive tokens associated with the path list in the markup file. The unique file identifiers, unique encryption key identifiers, and time-sensitive tokens can be generated by the security engine 134, for example, as described in further detail below. Once generated, the markup file is transmitted from the device services computing device 42 to the client computing device 50.

The client computing device 50 can request the files using the markup file. Thus, file distribution is driven by the creation of and reference to markup files. In other words, client computing devices reference the markup files as instructions for obtaining files. For example, the client computing device 50 can transmit a request for the files from the first cache computing device in the path list, such as the cache computing device 32B in the peer level 30, using the unique file and encryption key identifiers in the markup file. The client computing device 50 can also transmit the time-sensitive token along with the request. In some cases, when the client computing device 50 transmits a request for files to the cache computing device 32B, the request can include one or more of the path list, the unique file identifiers, the unique encryption key identifiers, and the time-sensitive tokens.

In turn, the distribution appliance 152 of the cache computing device 32B can compare a timing of the request for the files from the client computing device 50 against the time-sensitive token to confirm whether the path to the files is still valid. In other words, the distribution appliance 152 can reject requests for files which do not occur within a certain time from the generation of a markup file, for example, or another time-based requirement for the requests. If the request is valid, the distribution appliance 152 can then check the cache repository 140 to determine whether it has a copy of the files being requested, based on the unique file identifiers for the files.

If the cache computing device 32B does not have a copy of the requested files, then it is configured to request a copy of the files from one or more of the cache computing devices in its same peer level, peer level 30. The cache computing device 32B can request a copy of the files from one, two or more, or every other cache computing device on the peer level 30 before requesting the files from a cache computing device in a higher peer level, such as the peer level 20.

Once the search has been exhausted in peer level 30, the cache computing device 32B can refer to the path list from the client computing device 50 to determine which cache computing device in the peer level 20 the files should be requested from. The search for the files can proceed among any number of the peers in the peer level 20 as it did in the peer level 30. Finally, if none of the cache computing devices in the peer level 20 have a copy of the files, the path list will direct the cache computing device 32B to request the files from the device services computing device 42.

Wherever a copy of the files is found, they can be requested and propagated through the cache computing devices in the path list on the path back to the client device 50. Thus, the path list generated by the global cache computing device 40 identifies one cache computing device in each of the peer levels 20 and 30, followed by the device services computing device 42 at the end of the path. Before turning to a higher peer level, the cache computing devices in one peer level can first transmit requests for files among each other. In that way, file distribution demand is distributed among peer levels of the cache computing devices 22A, 22B, and 32A-32C, starting with the lower peer levels first, and away from the device services computing device 42. Once a copy of the files are obtained at the cache computing device 32B, the decryption service 154 can apply a decryption key to decrypt the files before or during transmission of the files back to the client device 50. The decryption key can be identified using the unique encryption key identifier in the original request for files from the client computing device 50. Additional examples of secure demand-driven file distribution are described below.

Figure 2:
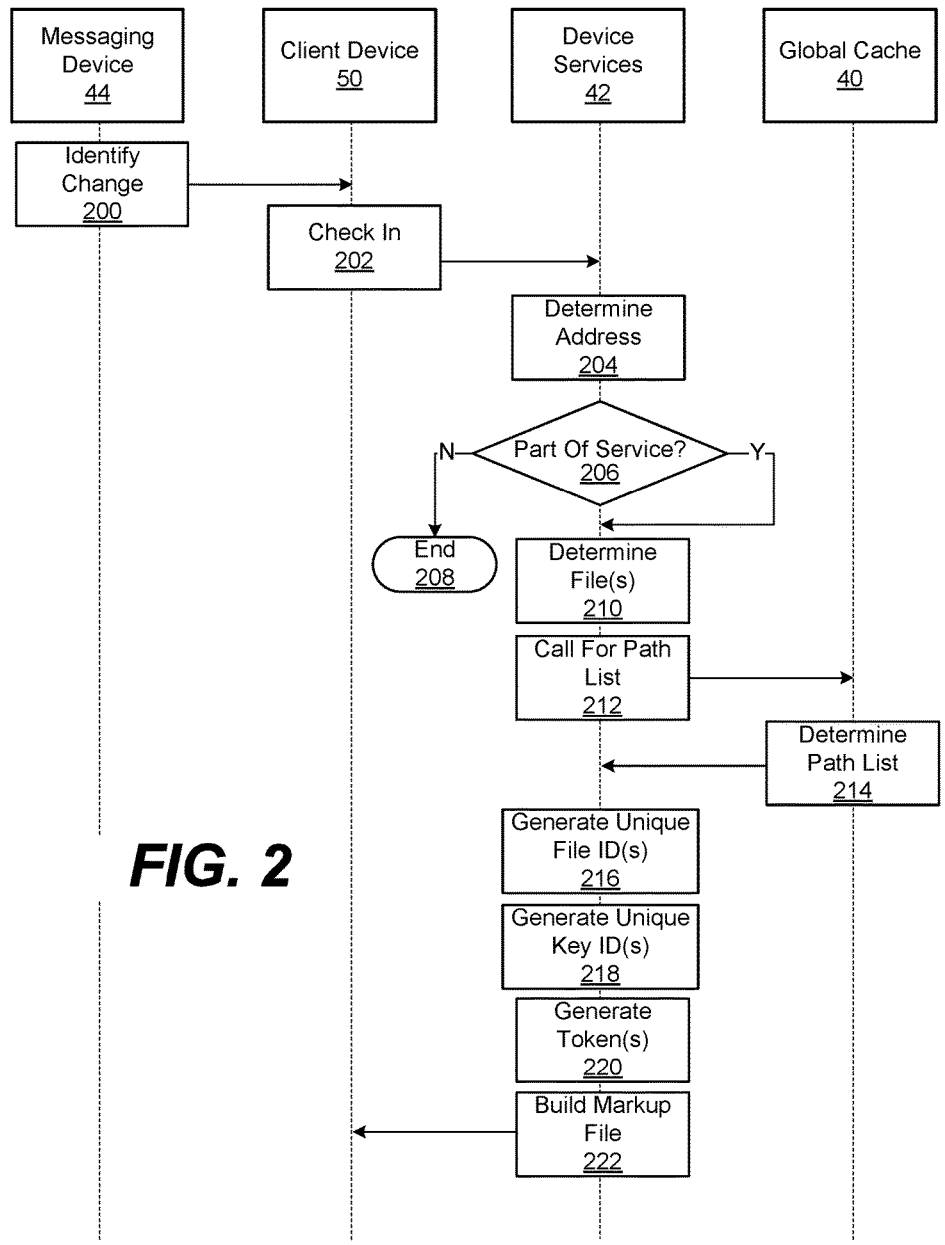
FIG. 2 illustrates a process for secure demand-driven file distribution according to various examples described herein.

FIG. 2 illustrates a process for secure demand-driven file distribution according to various examples described herein. Although the process is described below as being performed by the computing devices in the networked environment 10 shown in FIG. 1, the process can be performed by other, similarly configured computing devices and networked environments.

At step 200, the process includes the messaging computing device 44 identifying when new files are added or updated in the file repository 120 of the device services computing device 42. Additionally or alternatively, the messaging computing device 44 can identify that some other file distribution triggering event or condition has occurred at step 200. In response, the messaging computing device 44 transmits a notification to the client computing device 50 (or other client computing device(s)) to prompt it to check in with the device services computing device 42. The notification can be embodied as any message, prompt, push notification, or other communication from the messaging computing device 44 to the client computing device 50.

At step 202, the process includes the client computing device 50 transmitting a check in request to the device services computing device 42 in response to the prompt from the messaging computing device 44. The client computing device 50 can check in with the device services computing device 42 at other times and for other reasons besides being prompted by the messaging computing device 44, however. For example, the client computing device 50 can check in with the device services computing device 42 periodically over time, at one or more predetermined times, based on certain conditions, or at other timings.

When the client computing device 50 checks in, the device services computing device 42 is configured to perform certain tasks or functions. For example, at step 204, the process includes the distribution manager 132 of the device services computing device 42 determining one or more network addresses or other unique identifying information associated with the client computing device 50. The unique identifying information can be embodied as any type of unique identifying information, such as communications protocol addresses, network addresses, media access control addresses, or other addressing data, username and password information, or other unique data or credentials. This unique identifying information can be determined based on datagram header information communicated from the client computing device 50, with reference to the client device data 122, or other techniques.

At step 206, the process includes the distribution manager 132 determining whether or not one or more of the cache computing devices 22A, 22B, and 32A-32C are part of a relay service for the client computing device 50. As noted above, the distribution manager 132 can deny, modify, or tailor certain services for the client computing device 50, including the distribution of files, depending upon whether or not the cache computing devices 22A, 22B, and 32A-32C are part of a relay service for the client computing device 50. If none of the cache computing devices 22A, 22B, and 32A-32C (or the device services computing device 42) are part of the relay service, then the process can end at step 208, with or without a message being sent back to the client computing device 50. Alternatively, if one or more of the devices are part of the relay service, then the process proceeds to step 210.

At step 210, the process includes the distribution manager 132 determining one or more data files for distribution to the client computing device 50. For example, the distribution manager 132 can determine which data files in the file repository 120 should be distributed to the client computing device 50 with reference to lookup tables, version history, an update schedule, or other information stored in the client device data 122 or based on other considerations. Once the files for distribution are identified, the process proceeds to step 212.

At step 212, the process includes the distribution manager 132 transmitting a call to the global cache computing device 40 to determine a path list for the distribution of the files to the client computing device 50. The call can include certain information about the client computing device 50, such as the network addresses or other unique identifying information determined at step 204.

At step 214, the process includes the path manager 112 of the global cache computing device 40 determining an optimal or preferred path through which the client computing device 50 can request and retrieve the data files. The path manager 112 can determine the path list based on the network configuration data 110 and the network address or other unique identifying information of the client computing device 50. For example, the path manager 112 can select a path list based on network logical or geographic topology, bandwidth, availability, constraints, demand, latency, bottlenecks, capacity, or other related factors. As another example, the path manager 112 can determine the path list based on a predetermined path stored in the network configuration data 110 for the client computing device 50. As noted above, path lists determined by the global cache computing device 40 predefine the manner in which files are distributed over the networked environment 10. Because the network configuration data 110 can be modified and updated over time, the manner in which client computing devices request and receive files over the networked environment 10 can be modified and updated over time to manage network resources. After the path list is determined, it is transmitted back to the device services computing device 42 as shown in FIG. 2.

After receiving the path list from the global cache computing device 40, the device services computing device 42 starts the process of building a markup file. At steps 216 and 218, respectively, the process includes the security engine 134 of the device services computing device 42 generating one or more unique file identifier(s) and one or more unique encryption key identifiers(s) for the files. The unique file and key identifiers provide a certain level of security because the client device 50 can use them to request and identify files and keys without the need for actual knowledge of filenames, storage locations, or other sensitive information. Once generated, the device services computing device 42 stores the unique identifiers in the file repository 120. In certain cases, such as if the unique file and encryption key identifiers were generated previously, one or both of steps 216 and 218 can be omitted or skipped. As an additional measure of security, at step 220, the process includes the security engine 134 generating one or more time-sensitive tokens. The time-sensitive tokens can be used to validate that requests for files from the client computing device 50 are conducted within a certain minimum timeframe.

At step 222, the process includes the job definition engine 136 of the device services computing device 42 building a markup file for the client computing device 50. As one example, the markup file can be embodied as an XML or similar type of file, but can be formatted and structured in any suitable way. The markup file can include the path list generated by the global cache computing device 40 at step 214, along with the unique file and encryption key identifiers generated at steps 216 and 218 and the time-sensitive tokens generated at step 220. Once generated, the markup file is transmitted from the device services computing device 42 to the client computing device 50 as shown in FIG. 2. The transmission of the markup file back to the client computing device 50 is responsive to the check in request at step 202. The client computing device 50 can request the files using the markup file as described with reference to FIG. 3.

Figure 3:
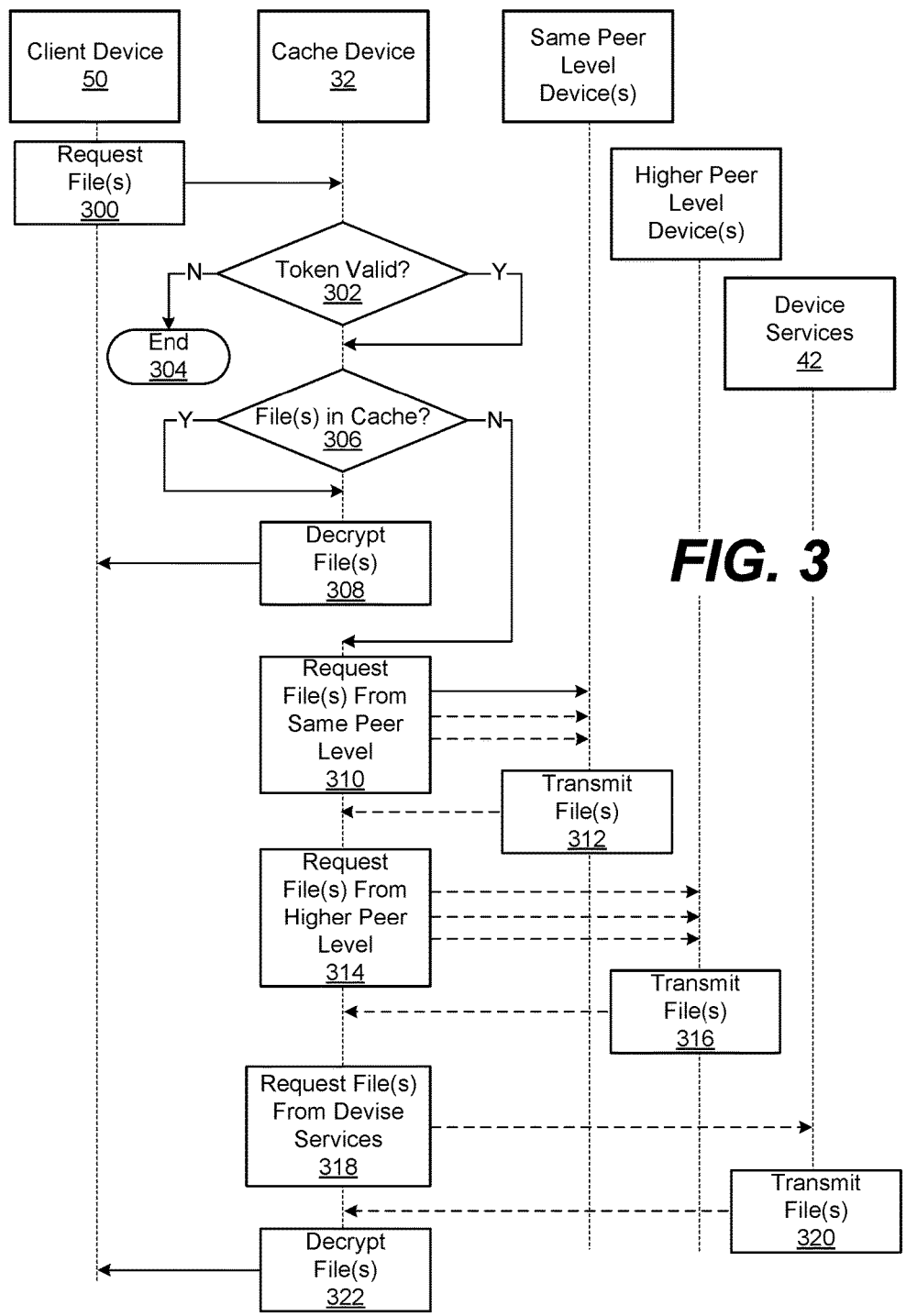
FIG. 3 further illustrates a process for secure demand-driven file distribution according to various examples described herein.

FIG. 3 further illustrates a process for secure demand-driven file distribution according to various examples described herein. At step 300, the process includes the client computing device 50 requesting the files with reference to the path list in the markup file received from the device services computing device 42. For example, the client computing device 50 can transmit a request for the files from the first cache computing device in the path list, such as the cache computing device 32B in the peer level 30, using the unique file and encryption key identifiers in the markup file. The client computing device 50 can also transmit the time-sensitive token along with the request. In some cases, when the client computing device 50 transmits a request for files, the request can include one or more portions of information from the markup file, such as, in part or whole, the path list, unique file identifier(s), unique encryption key identifier(s), and time-sensitive token(s).

At step 302, the distribution appliance 152 of the cache computing device 32B can compare a timing of the request for the files from the client computing device 50 against the time-sensitive token to confirm whether the path to the files is still valid. In other words, the distribution appliance 152 can reject requests for files which do not occur within a certain time from the generation of a markup file, for example, or another time-based requirement for the requests. If the request is no longer valid, then the process proceeds to step 304 and ends, with or without a message being sent back to the client computing device 50. If the request is valid, then the process proceeds to step 306.

At step 306, the process includes the distribution appliance 152 checking whether the cache repository 140 includes a copy of the files being requested, based on the unique file identifiers for the files. If the cache repository 140 includes a copy of the files, then the process proceeds to step 308. At step 308, the decryption service 154 of the cache computing device 32B uses a decryption key to decrypt the files as they are distributed to the client computing device 50 as shown in FIG. 3. The decryption key, which can be stored in the security data 142 of the cache computing device 32B, can be identified based on any unique key identifiers received from the client computing device 50.

If the cache computing device 32B does not have a copy of the requested files, then the process proceeds to step 310. Here, the cache computing device 32B requests a copy of the files from one or more of the cache computing devices in its same peer level, peer level 30. The cache computing device 32B can request a copy of the files from one, two or more, or every other cache computing device on the peer level 30 (e.g., one or more of the cache computing devices 32A and 32C) until it identifies one with a copy of the files. Once the files are found at any one of the cache computing devices in the peer level 30, it can transmit or distribute the requested files back to the cache computing device 32B at step 312.

If none of the cache computing devices in the peer level 30 have a copy of the files, then the process proceeds to step 314. In other words, once the search has been exhausted in peer level 30, the cache computing device 32B can refer to the path list from the client computing device 50 to determine which cache computing device in the peer level 20 the files should be requested from. For example, the cache computing device 32B can start with a request to the cache computing devices 22A and, if necessary, proceed to request the files from the cache computing devices 22B. At step 314, the search for the files can proceed among any number of the peers in the peer level 20 (e.g., one or more of the cache computing devices 22A and 22B) as it did in the peer level 30. Any of the cache computing devices in the peer level 20 can transmit or distribute the requested files back to the cache computing device 32B at step 316.

If none of the cache computing devices in the peer level 20 (or any other higher peer level) have a copy of the files, then the path list will direct the cache computing device 32B to request the files from the device services computing device 42. In that case, at step 318, the cache computing device 32B can request a copy of the files from the device services computing device 42 at step 318. In turn, the device services computing device 42 can distribute a copy of the files back to the cache computing device 32B at step 320.

Once the cache computing device 32B has obtained a copy of the files, at step 322, the process includes the decryption service 154 decrypting the files as they are distributed to the client computing device 50 as shown in FIG. 3. Although FIG. 3 illustrates step 322 after step 320, the decrypting can occur after steps 312 or 316 or at any other time upon the distribution of the files back to the cache computing device 32B.

The flowcharts of FIGS. 2 and 3 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing devices described herein can include at least one processing circuit. The processing circuit can include, for example, one or more processors and one or more storage devices that are coupled to a local interface. The local interface can include, for example, a data bus with an accompanying address/control bus or any other suitable bus structure. The one or more storage devices can store data or components that are executable by the one or more processors of the processing circuit. For example, the path manager 112, distribution manager 132, security engine 134, job definition engine 136, distribution appliance 152, decryption service 154, and/or other components can be stored in one or more storage devices and be executable by one or more processors in the computing devices.

The path manager 112, distribution manager 132, security engine 134, job definition engine 136, distribution appliance 152, decryption service 154, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in a non-transitory computer-readable medium for use by or in connection with an instruction execution system such as one of the processors or processing circuits described herein. The computer-readable medium can contain, store, and/or maintain the software or program instructions for use by or in connection with the instruction execution system. A computer-readable medium can include a physical media, such as, magnetic, optical, semiconductor, and/or other suitable media. Examples of suitable computer-readable media include, but are not limited to, solid-state drives, magnetic drives, or flash memory.

Further, any logic or applications described herein, including the path manager 112, distribution manager 132, security engine 134, job definition engine 136, distribution appliance 152, or decryption service 154 can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All modifications and variations are intended to be included herein within the scope of this disclosure and protected by the following claims.

Therefore, the following is claimed:

1. A system for file distribution, comprising:
a messaging computing device configured to transmit a notification based on a change in content in a distribution network;
a client device configured to receive the notification and transmit a check in request in response to the notification; and
a device services computing device configured to:
receive the check in request from the client device;
transmit a call to a global cache computing device for a path list of one or more of a plurality of cache computing devices in the distribution network for distribution of a file to the client device;
build a markup file including the path list for the file; and
transmit the markup file to the client device in response to the check in request.

2. The system of claim 1, wherein the device services computing device is further configured to determine whether one or more of the plurality of cache computing devices are part of a relay service for the client device.

3. The system of claim 1, wherein the device services computing device is further configured to:
determine a network address of the client device; and
forward the network address of the client device to the global cache computing device in the call for the path list.

4. The system of claim 3, wherein the global cache computing device is configured to determine the path list for distribution of the file to the client device based on the network address of the client device and a network distribution configuration for the plurality of cache computing devices.

5. The system of claim 4, wherein:
the plurality of cache computing devices are arranged in a plurality of peer levels; and
the path list identifies one or more of the plurality of cache computing devices in each of the plurality of peer levels for distribution of the file to the client device based on the network address of the client device and the network distribution configuration.

6. The system of claim 1, wherein the markup file includes the path list, a time-sensitive token associated with the path list, a unique file identifier for the file, and a unique key identifier for an encryption key for the file.

7. The system of claim 1, wherein:
the client device transmits a request for the file to a first cache computing device among the plurality of cache computing devices based on the path list in the markup file, the request for the file including the path list for the file; and
the first cache computing device is configured to:
determine whether the file exists in a local data store of the first cache computing device; and
in response to a determination that the file does not exist in the local data store, transmit a peer level request for the file to a second cache computing device in a peer level of the first cache computing device, the peer level of the first cache computing device including a subset of the plurality of cache computing devices.

8. The system of claim 7, wherein the cache computing device is further configured to:
in response to a determination that the file does not exist among the subset of the plurality of cache computing devices in the peer level of the first cache computing device, transmit a higher peer level request for the file to a higher peer level of the plurality of cache computing devices according to the path list for the file.

9. The system of claim 8, wherein at least one cache computing device in the peer level receives and stores the file from the higher peer level based on the higher peer level request.

10. A method for file distribution, comprising:
receiving, by at least one of one or more computing devices, a check in request from a client device;
determining, by at least one of the one or more computing devices, a path list of one or more of a plurality of cache computing devices in a distribution network for distribution of a file to the client device;
building, by at least one of the one or more computing devices, a markup file including the path list for the file; and
transmitting, by at least one of the one or more computing devices, the markup file to the client device in response to the check in request.

11. The method of claim 10, further comprising:
identifying, by at least one of the one or more computing devices, a change in content in a distribution network; and
transmitting, by at least one of the one or more computing devices, a notification to the client device based on the change in file content.

12. The method of claim 10, further comprising:
generating, by at least one of the one or more computing devices, a time-sensitive token associated with the path list, a unique file identifier for the file, and a unique key identifier for an encryption key for the file; and
including, by at least one of the one or more computing devices, the time-sensitive token, the unique file identifier, and the unique key identifier in the markup file.

13. The method of claim 10, wherein the path list is further determined based on a network address of the client device and a network distribution configuration for the plurality of cache computing devices.

14. The method of claim 13, wherein:
the plurality of cache computing devices are arranged in a plurality of peer levels; and
the path list identifies one or more of the plurality of cache computing devices in each of the plurality of peer levels for distribution of the file to the client device based on the network address of the client device and the network distribution configuration.

15. The method of claim 14, further comprising:
receiving, by a first cache computing device among the plurality of cache computing devices, a request for the file from the client device, the request for the file including the path list for the file;
determining, by the first cache computing device, whether the file exists in a local data store; and
in response to a determination that the file does not exist in the local data store, transmitting, by the first cache computing device, a peer level request for the file to a second cache computing device in a peer level of the first cache computing device, the peer level of the first cache computing device including a subset of the plurality of cache computing devices.

16. The method of claim 15, further comprising, in response to a determination that the file does not exist among the subset of the plurality of cache computing devices in the peer level of the first cache computing device, transmitting, by the first cache computing device, a higher peer level request for the file to a higher peer level of the plurality of cache computing devices according to the path list for the file.

17. A non-transitory computer-readable medium embodying program code executable in one or more computing devices, the program code being configured to cause at least one of the one or more computing devices to at least:
receive a check in request from a client device;
determine a path list of one or more of a plurality of cache computing devices in a distribution network for distribution of a file to the client device;
generate a time-sensitive token associated with the path list, a unique file identifier for the file, and a unique key identifier for an encryption key for the file;
build a markup file including the path list for the file, the token associated with the path list, the unique file identifier, and the unique key identifier; and
transmit the markup file to the client device in response to the check in request.

18. The non-transitory computer-readable medium of claim 17, wherein the program code is further configured to cause at least one of the one or more computing devices to at least:
receive a request for the file from the client device, the request for the file including the path list, the unique file identifier, and unique key identifier, and the time-sensitive token;
determine whether the path list is valid based on the time-sensitive token; and in response to a determination that the path list is valid, determine whether the file exists in a local data store based on the unique file identifier.

19. The non-transitory computer-readable medium of claim 18, wherein the program code is further configured to cause at least one of the one or more computing devices to at least:

decrypt the file based on the unique key identifier and transmit the file to the client device in response to a determination that the file exists in the local data store.

20. The non-transitory computer-readable medium of claim 18, wherein the program code is further configured to cause at least one of the one or more computing devices to at least:

transmit a peer level request for the file to another one of the one or more computing devices in response to a determination that the file does not exist in the local data store.

* * * * *